United States Patent
Koshigoe

(10) Patent No.: US 9,505,247 B2
(45) Date of Patent: Nov. 29, 2016

(54) PORTABLE PRINTER

(71) Applicant: SATO HOLDINGS KABUSHIKI KAISHA, Tokyo (JP)

(72) Inventor: Ikuo Koshigoe, Tokyo (JP)

(73) Assignee: SATO HOLDINGS KABUSHIKI KAISHA (JP)

( * ) Notice: Subject to any disclaimer, the term of this patent is extended or adjusted under 35 U.S.C. 154(b) by 0 days.

(21) Appl. No.: 14/888,249

(22) PCT Filed: Jul. 29, 2014

(86) PCT No.: PCT/JP2014/069949
§ 371 (c)(1),
(2) Date: Oct. 30, 2015

(87) PCT Pub. No.: WO2015/064160
PCT Pub. Date: May 7, 2015

(65) Prior Publication Data
US 2016/0059598 A1   Mar. 3, 2016

(30) Foreign Application Priority Data

Oct. 28, 2013   (JP) .................................. 2013-223250

(51) Int. Cl.
| | | |
|---|---|---|
| B41J 29/02 | (2006.01) | |
| B41J 29/13 | (2006.01) | |
| B41J 3/36 | (2006.01) | |
| B41J 2/32 | (2006.01) | |

(52) U.S. Cl.
CPC ........ B41J 29/02 (2013.01); B41J 2/32 (2013.01); B41J 3/36 (2013.01); B41J 29/13 (2013.01)

(58) Field of Classification Search
CPC ........... H02G 3/08; B41J 29/02; B41J 29/13; B41J 3/36
See application file for complete search history.

(56) References Cited

U.S. PATENT DOCUMENTS

2005/0056444 A1 *   3/2005   Murata .................. B41J 3/4075
174/50

FOREIGN PATENT DOCUMENTS

| JP | S63-111022 | 5/1988 |
|---|---|---|
| JP | H08-274483 | 10/1996 |
| JP | H08-300752 | 11/1996 |
| JP | H10-235909 | 9/1998 |
| JP | 3007723 | 11/1999 |
| JP | 2001-113785 | 4/2001 |
| JP | 2001-260466 | 9/2001 |
| JP | 2001260466 A * | 9/2001 |
| JP | 2003-273987 | 9/2003 |
| JP | 2004-216611 | 8/2004 |
| JP | 2005-088239 | 4/2005 |
| JP | 2006-327153 | 12/2006 |
| JP | 2014-188704 | 10/2014 |

OTHER PUBLICATIONS

International Search Report dated Oct. 21, 2014 issued in corresponding International patent application No. PCT/JP2014/069949.
Written Opinion dated Oct. 21, 2014 issued in corresponding International patent application No. PCT/JP2014/069949.

* cited by examiner

*Primary Examiner* — Sarah Al Hashimi
(74) *Attorney, Agent, or Firm* — Ostrolenk Faber LLP

(57) ABSTRACT

A portable printer and a member having a two-layer configuration formed from members having different mold shrinkage ratios and having a superior shock resistance without distortion may be achieved. The member (50) including an inner layer (52) formed from a first material and an outer layer (54) formed from a second material. The second material has a higher mold shrinkage ratio than the first material. A protrusion (52A) included on at least at one end of the inner layer (52), such that an end surface (54a) of the outer layer (54) is covered by the protrusion (52A).

10 Claims, 9 Drawing Sheets

PORTABLE PRINTER

CROSS REFERENCE TO RELATED APPLICATIONS

The present application is a 35 U.S.C. §371 National Phase conversion of PCT/JP2014/069949, filed Jul. 29, 2014, which claims benefit of Japanese Application No. 2013-223250, filed Oct. 28, 2013, the disclosure of which is incorporated herein by reference. The PCT International Application was published in the Japanese language.

TECHNICAL FIELD

A present disclosure relates to a member and a portable printer. Specifically, the present disclosure relates to a member that has a two-layered configuration including an inner layer of a first material and an outer layer of a second material; and the portable printer that includes the member.

BACKGROUND ART

The portable printer includes a printer that is configured to print on a printing paper. As the portable printer, a label printer is known, e.g., that includes a function for ejecting a label by separating the label from a strip-shaped mount (e.g., Patent Literature 1).

The portable printer is configured to print a value or a barcode on the label at a store or a place of sales. The label is attached to merchandise. In such a case, the portable printer is operated while being held by the hands of an operator, or operated while being attached to a body of the operator via clothing or a belt (e.g., Patent Literature 2).

RELATED ART

Patent Literature

Patent Literature 1: JP-A H08-300752; and
Patent Literature 2: JP-A 2001-113785.

SUMMARY OF THE INVENTION

Problems to be Solved by the Invention

With regard to a portable printer, in particular, a part other than a printing part including a printing head may be damaged or broken-down as a result of an impact such as falling or collision, such that a printing function and an ejection function may be impaired. Accordingly, a portable printer with improved shock resistance is in demand. Further, a member that has superior shock resistance is sought for a printer, i.e., such a member need not be limited to a portable printer. In addition, portable printers are typically produced by a resin formation process. A shape or deformation of a resin casing has influence on assembly position accuracy such as a printing unit that is attached above the casing. Accordingly, the shape or deformation of the resin casing plays an important role in print quality. Accordingly, a resin casing that does not deform is sought.

A present disclosure has been conceived of in view of various conventional problems. As a result, a member and a printer that are superior in shock resistance without deformation are proposed.

Means for Solving the Problems

A member according to a present disclosure, includes: an inner layer formed of a first material; and an outer layer formed of a second material, in which the outer layer covers the inner layer, the outer layer has a higher mold shrinkage ratio than the first material, a protruding part is formed on at least one end of the inner layer, and the protruding part covers an end surface of the outer layer, in order to achieve an objective.

According to the present disclosure, the second material having the higher mold shrinkage ratio than the first material is used as the outer layer disposed on the inner layer formed of the first material in order to achieve superior shock resistance in the member formed of the first material. Further, the protruding part included on the inner layer having the first material covers the end surface of the outer layer having the second material, such that shrinkage of the second material is structurally prevented by the protruding part having the first material.

According to the present disclosure, a member is proposed that has superior shock resistance without deformation. Moreover, according to the member of an embodiment of the present disclosure, it is desirable that the inner layer and the outer layer are formed by double molding.

Injection molding the inner layer and the outer layer may be possible by overlapping two types of materials during a single molding, by molding using double molding. Accordingly, it is possible to produce a high-strength or low-cost member.

According to an embodiment of the member of the present disclosure, it is desirable that the first material is a plastic and the second material is an elastomer.

According to an embodiment of the member of the present disclosure, it is desirable that the member is a housing.

The portable printer according to the present disclosure includes: the member; and a printer configured to attach to the member, such that the printer prints on a printing paper, in order to achieve an objective.

Effects of the Invention

According to a present disclosure, a member and a printer may be achieved that are superior in shock resistance without deformation.

DETAILED DESCRIPTION OF THE INVENTION

Hereinafter, embodiments of a present disclosure will be explained in detail with reference to the drawings.

The present disclosure describes a housing of a portable printer, including: a member composed of an inner layer formed of a first material and an outer layer formed of a second material, in which the outer layer covers the inner layer, the second material has a higher mold shrinkage ratio than the first material, and a protruding part included on at least one end of the inner layer covers an end surface of the outer layer. However, the member according to the present disclosure is not limited to the housing of the portable printer. Accordingly, any member may be implemented as appropriate.

Figure 1:
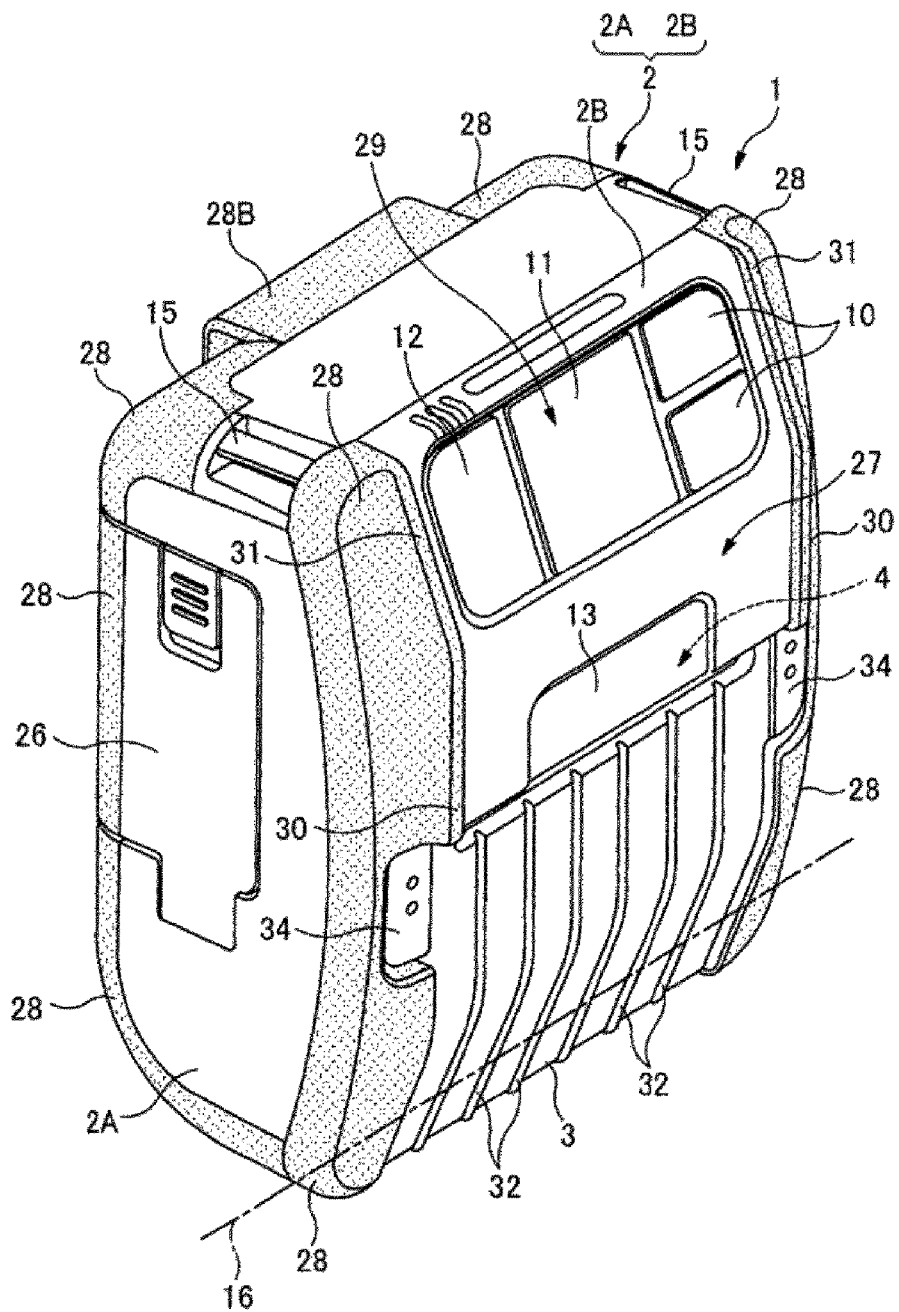
FIG. 1 shows a perspective view of a portable printer.
Figure 2:
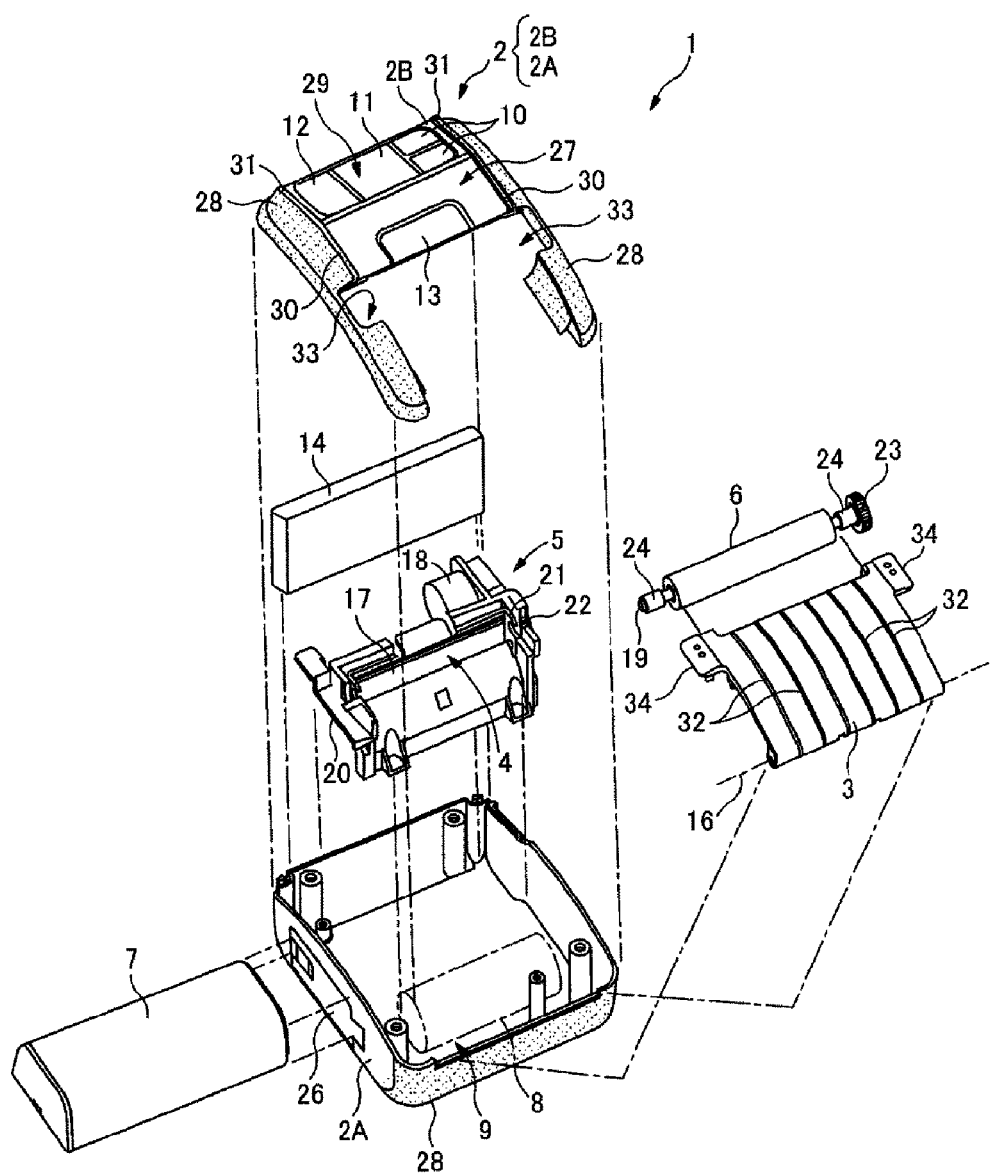
FIG. 2 shows an exploded perspective view of the portable printer of FIG. 1.

FIG. 1 shows a perspective view of an external configuration of an embodiment of a portable printer; and FIG. 2 shows an exploded perspective view of the portable printer of FIG. 1.

A portable printer 1 is configured as a thermal printer. The portable printer 1 includes: a housing 2; an opening and closing cover 3; a printing unit 5 (not shown in FIG. 1) including a printing part 4; a platen roller 6; a rechargeable battery 7; a supplying part 9 for a continuous label body (printing paper) 8 (not shown in FIG. 1); an inputter 10; a display 11; a power switch 12; a press-release button 13; and a control circuit board 14.

A first housing 2A and a second housing 2B are combined to form the housing 2 of the portable printer 1. The housing 2 has an operator-portable size. In FIG. 1, a belt-hanging part 15 is included on an upper side, and the entire portable printer 1 is configured to be hangable from a shoulder of an operator by a shoulder-hanging belt (not shown). Of course, a present configuration may also be modified so as to attach to a waist of the operator.

Further, the opening and closing cover 3 that surrounds a cover shaft 16 positioned at a lower corner part in FIG. 2 is openably and closably mounted to the housing 2. As a result, it is possible for storage of the continuous label body 8 to the supplying part 9 and for loading into the portable printer 1.

Figure 3:
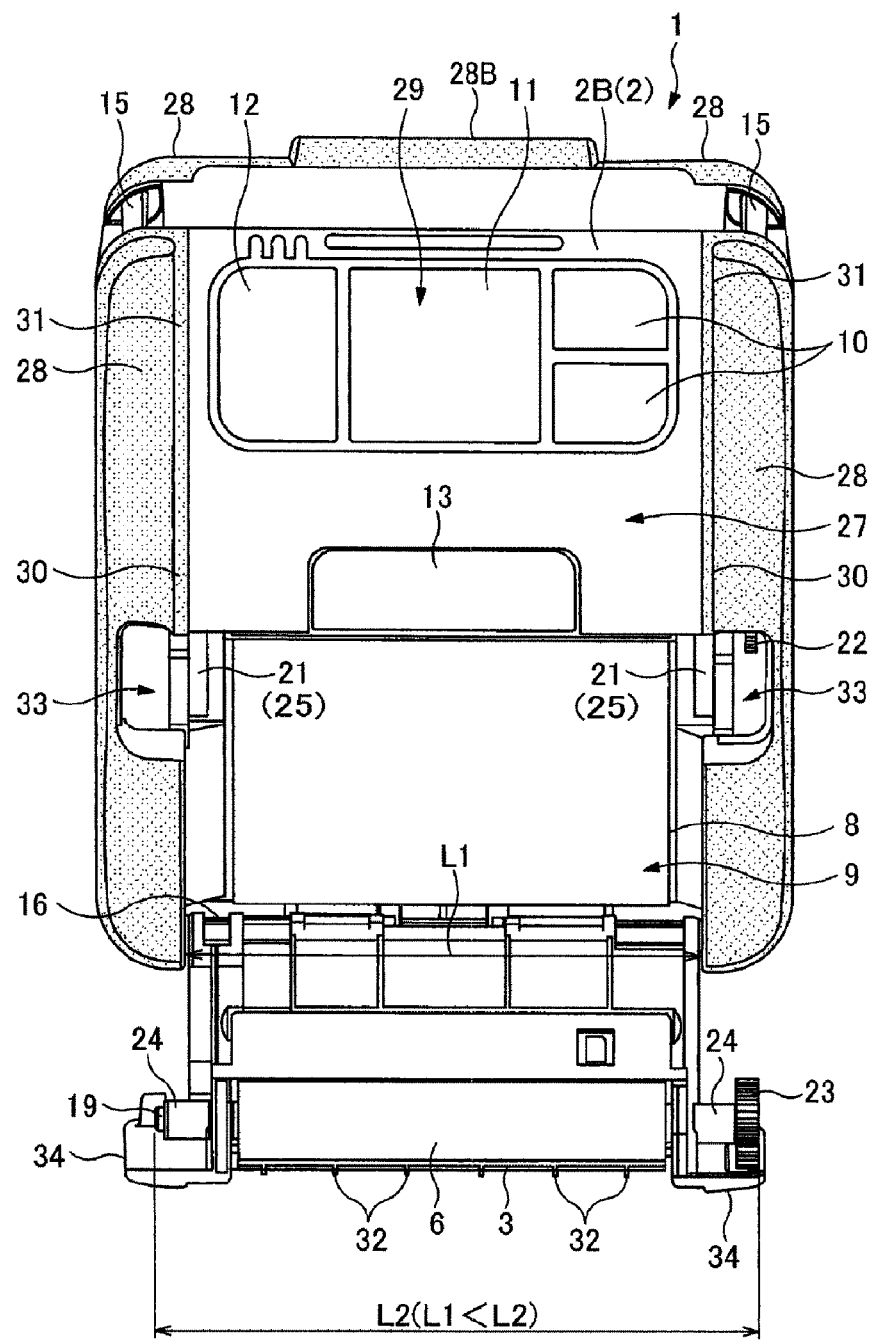
FIG. 3 shows a planar view of an opening and closing cover of the portable printer of FIG. 1 in an opened configuration.
Figure 4:
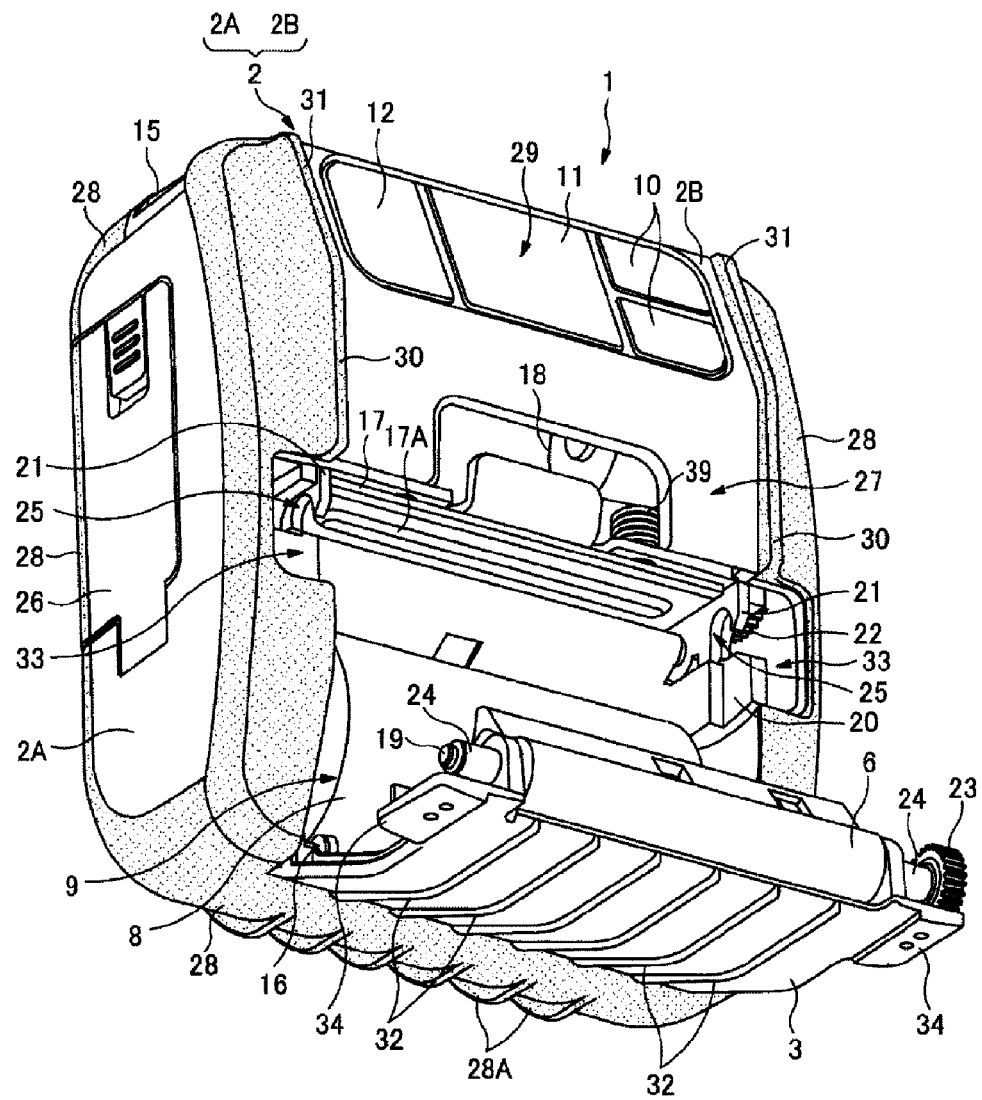
FIG. 4 shows a perspective view of the opening and closing cover of the portable printer of FIG. 1 in an opened configuration.

FIG. 3 shows a planar view of the opening and closing cover 3 of the portable printer of FIG. 1 in an opened configuration; and FIG. 4 shows a perspective view of the opening and closing cover 3 of the portable printer of FIG. 1 in an opened configuration. FIG. 4 illustrates a configuration that has the press-release button 13 omitted therefrom.

The continuous label body 8 is a structure having a plurality of label pieces temporarily attached onto a strip-shaped mount. The label piece is a so-called "thermal label." It is possible to print by coating a thermosensitive color developing layer onto a surface of the label piece.

The printing part 4 includes: a thermal head 17 (printing head) configured to attach to the housing 2 (printing unit 5); the platen roller 6 configured to rotatably attach to a side end opposing the cover shaft 16 that is positioned on a first end of the opening and closing cover 3; and a drive motor 18 configured to rotatably drive the platen roller 6.

The thermal head 17 is configured to print on the continuous label body 8 by receiving printing data from the control circuit board 14.

The platen roller 6 is configured to rotatably attach around the platen roller shaft 19. In a case where the opening and closing cover 3 is in a closed configuration with respect to the housing 2, as shown in FIG. 1, the continuous label body 8 is sandwiched between the platen roller 6 and the thermal head 17 that opposes the platen roller 6, and the platen roller 6 feeds the continuous label body 8.

The printing unit 5 is disposed on a unit body 20, and includes: the thermal head 17 of the printing part 4; a cover lock 21; and a drive gear 22 from the drive motor 18 (a final gear in a gear train of a connecting gear is described in FIG. 2).

The platen roller 6 includes a platen roller gear 23 at one end of a platen roller shaft 19. The platen roller gear 23 is configured to rotatably drive the platen roller 6.

The drive gear 22 is included in the housing 2. The platen roller gear 23 may be rotatably driven by being engaged with the drive gear 22 opposed by the platen roller 6. In other words, the platen roller gear 23 and the drive gear 22 are engaged by closure of the opening and closing cover 3 towards the housing 2, and the platen roller 6 may be rotatably driven by the drive motor 18.

In a case where the continuous label body 8 is sandwiched between the thermal head 17 and the platen roller 6, the platen roller 6 is rotatably driven by the drive motor 18, a heating element 17A (see, FIG. 4) of the thermal head 17 is heated in response to printing data supplied to the thermal head 17 from the control circuit board 14, and thermal printing is applied to the continuous label body (label piece) 8.

Further, a left and right lockpin 24 are disposed on both ends of the platen roller shaft 19, in order to engageably lock the opening and closing cover 3 such that the platen roller 6 is pressed with respect to the thermal head 17. In other words, a left and right platen roller lock engagement part 25 of the cover lock 21 in the housing 2 opposed by the platen roller 6 is configured to disengage with the left and right lockpin 24.

The engagement between the cover lock 21 (platen roller lock engagement part 25) and the lockpin 24 is released against a biasing force of the head-biasing spring 39 by operating the press-release button 13 so as to be pressed into the housing 2. The cover lock 21 (thermal head 17) is then rotated so as to separate from the platen roller 6 in the unit body 20, the opening and closing cover 3 is disengaged with respect to the housing 2, and the continuous label body 8 is loadably inserted between the thermal head 17 and the platen roller 6.

The rechargeable battery 7 is attachably and detachably stored inside the housing 2 (first housing 2A) by opening a battery cover 26. The rechargeable battery 7 is configured to supply electric power to an entire system of the portable printer 1, which includes the printing part 4 (thermal head 17) and the drive motor 18.

The inputter 10 is configured to input required data or command to the portable printer 1.

The display 11 is configured to display information input via the inputter 10 or other required information.

The control circuit board 14 is configured to send and receive the data and command to and from the printing part 4, the rechargeable battery 7, the inputter 10, the display 11, and the power switch 12; and to control the printing part 4, the rechargeable battery 7, the inputter 10, the display 11, and the power switch 12, where appropriate.

In the portable printer 1 configured as described above, an outer layer 28 is formed as the second material composed of a flexible resin, next to a printing part arrangement area surface 27 in the housing 2, which has the printing part 4 positioned therein. Accordingly, resistance to an impact from falling may be ensured. A hard and rigid inner layer 40 (see, FIGS. 5 to 8) is formed as the first material composed of a hard resin. Accordingly, easy assembly of the printing unit 5, the control circuit board 14, or the like, may be on the first housing 2A may be allowed. Further, in a case of using the double molding to mold two different materials such as those mentioned above, an instance may arise where a mold shrinkage ratio of each material may be different. A deformation resulting from a difference in a mold shrinkage may be prevented by forming a protruding part such that a material having a low mold shrinkage ratio faces a material having a high mold shrinkage ratio. Hereinafter, the above will be described in detail.

A point is added to a description in each figure to illustrate the outer layer 28 composed of the second material that has a higher mold shrinkage ratio than the first material. However, a region or member including the outer layer 28 is not limited to an example in the figure. For example, the outer layer 28 may also be included in the opening and closing cover 3 in FIGS. 1 to 4.

It is preferable that the material of the inner layer 40 (see, FIGS. 5 to 8) is a plastic and the material of the outer layer 28 is an elastomer. A wide variety of plastics may be used as the above plastic. However, it is preferable that the plastic is a resin selected from the group consisting of a polycarbonate-based resin, a polypropylene-based resin, and a polyacetal-based resin. Further, a wide variety of elastomers may be used as the above elastomer. However, it is preferable that the elastomer is selected from the group consisting of an olefin-based elastomer, a polyether-based elastomer, and a polyester-based elastomer is preferable.

Figure 5:
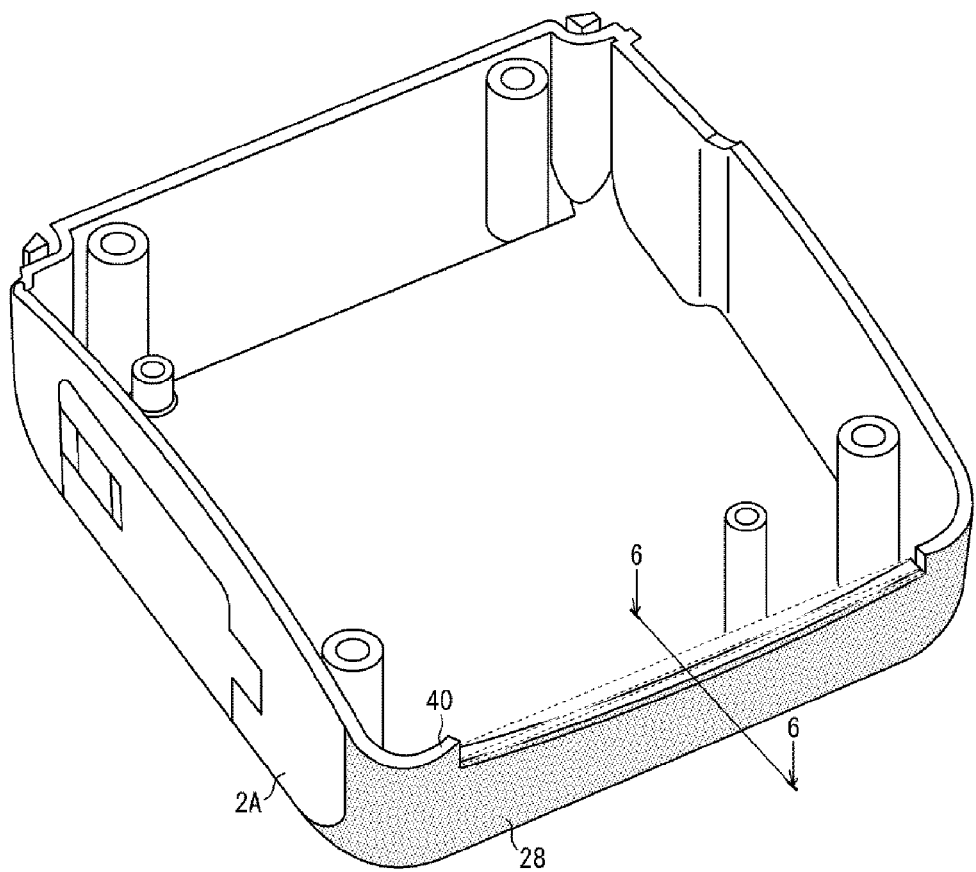
FIG. 5 shows a perspective view of a housing.
Figure 6:
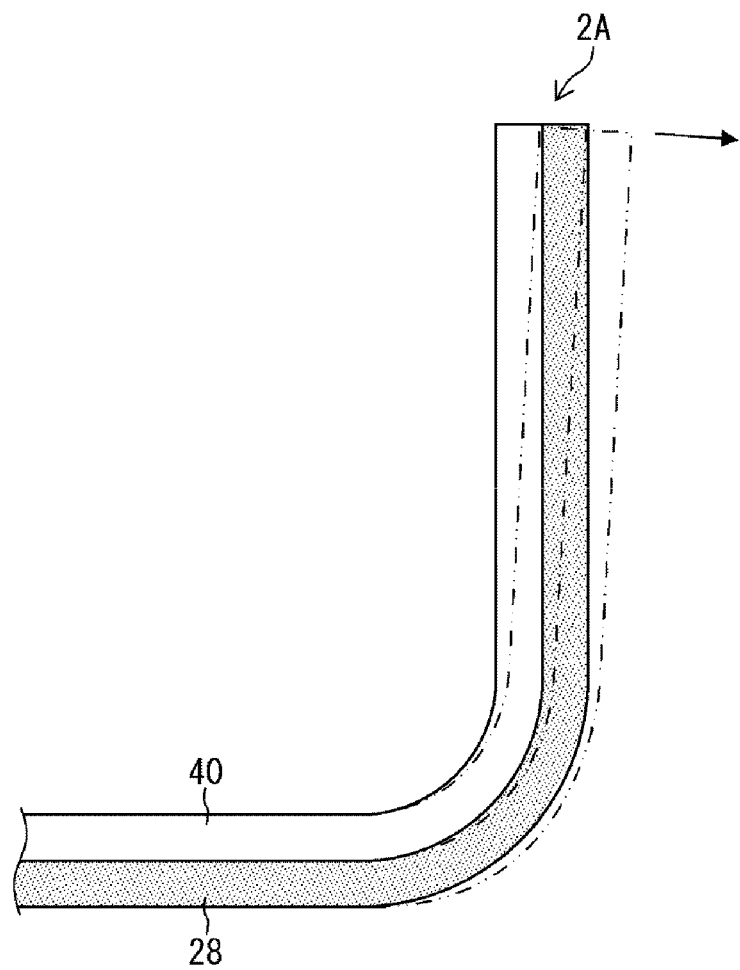
FIG. 6 shows a cross-sectional view along line 6-6 of FIG. 5.

FIG. 5 shows a perspective view of the first housing 2A; and FIG. 6 shows a cross-sectional view along line 6-6 of FIG. 5.

The housing 2 (first housing 2A) has a two-layered configuration including: the inner layer 40; and the outer layer 28 disposed on an outer side of the inner layer 40. The inner layer 40 is composed of a first material, and the outer layer 28 is composed of a second material. The second material has a higher mold shrinkage ratio than the first material. As indicated in FIGS. 5 and 6, the second material has a higher shrinkage ratio than the first material, and thus a shrinkage (or expansion) difference may occur due to temperature. As a result, the member may be distorted (or deformed) towards an outer side of the member, and the outer layer 28 may be separated from the inner layer 40 in a severe case.

Figure 7:
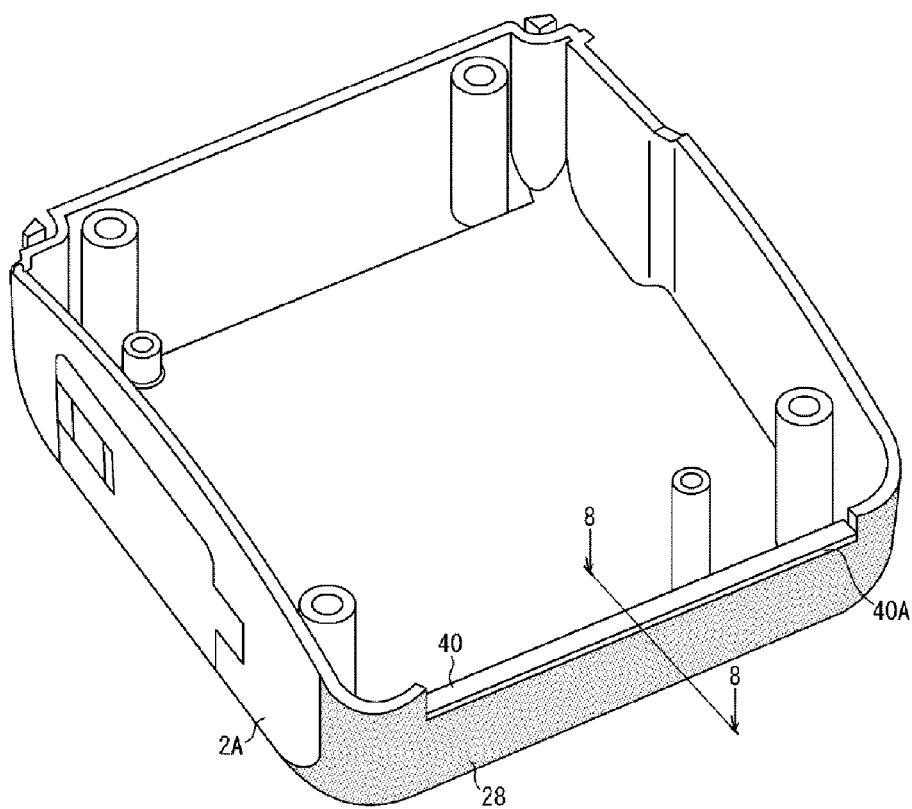
FIG. 7 shows a perspective view of a housing according to a present disclosure.
Figure 8:
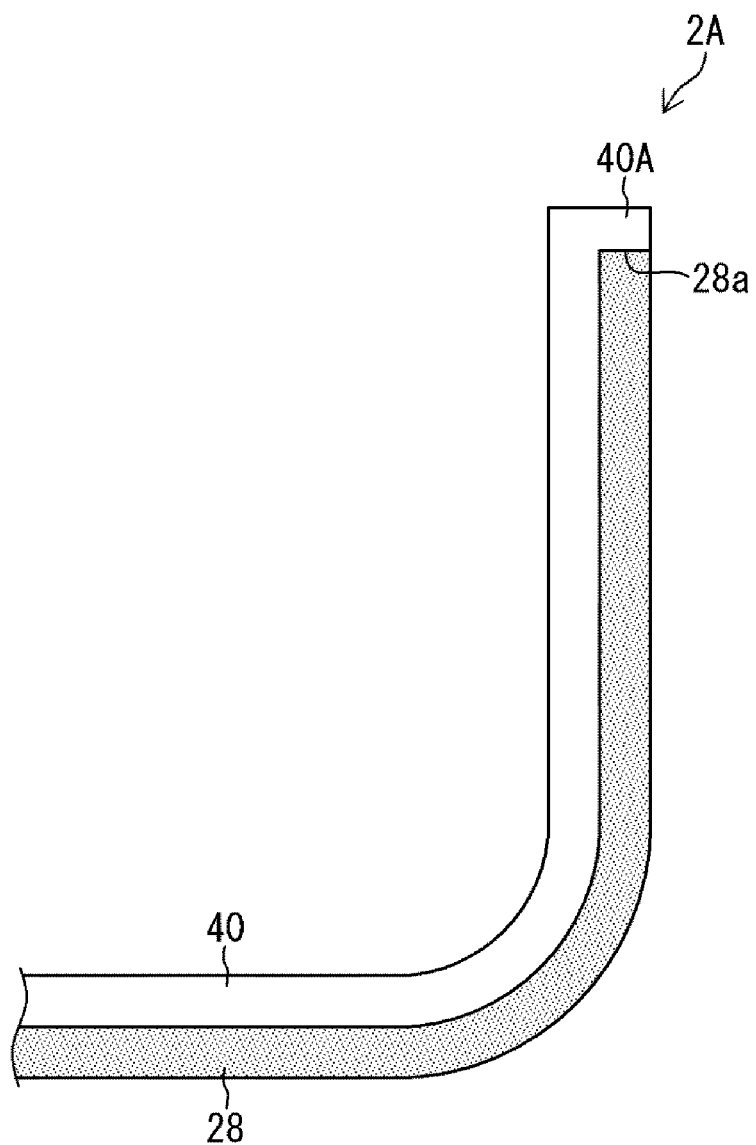
FIG. 8 shows a cross-sectional view along line 8-8 of FIG. 7.

FIG. 7 shows a perspective view of the first housing 2A according to a present disclosure; and FIG. 8 shows a cross-sectional view along line 8-8 of FIG. 7.

As shown in FIGS. 7 and 8, a protruding part 40A is formed on the inner layer 40, which is comprised of the first material. The protruding part 40A covers an end surface 28a of the outer layer 28, which is composed of the second material. The deformation resulting from the shrinkage of the second material or the like is structurally prevented by the protruding part 40A. In other words, distortion of the outer layer 28 towards an outer side resulting from shrinking the outer layer 28 more than the inner layer 40 is prevented by the protruding part 40A that suppresses the end surface 28a of the outer layer 28. As a result, deformation or the like resulting from shrinkage of the outer layer 28 is suppressed.

As previously described, a superior member that does not distort may be achieved by applying a two-layered configuration including: an inner layer comprised of the first material; and an outer layer comprised of the second material having a higher mold shrinkage ratio than the first material. Further, the protruding part that covers an end surface of the outer layer is formed on at least one end of the inner layer, In the present embodiment, it is preferable that the inner layer and the outer layer are formed by double molding. Injection molding the inner layer 40 and the outer layer 28 may be possible by overlapping two types of materials during a single molding, by molding using double molding. Accordingly, it is possible to produce a low-cost housing 2A and a high-strength member.

On the other hand, as shown in FIGS. 1, 3 and 4, or the like, a plurality of reinforcing ribs 32 are formed to protrude in a direction orthogonal to the cover shaft 16 on a top surface of the opening and closing cover 3, so as to increase a mechanical strength of the opening and closing cover 3.

Further, as shown in FIGS. 1, 3 and 4, a stress concentration in each corner part resulting from an external force, falling, or the like, is avoided by formation of a curved surface shape for each corner part (eight locations total) of the housing 2 that is substantially rectangular shaped, so as to ensure a mechanical strength or resistance to shock.

Accordingly, the cover shaft 16 of the opening and closing cover 3 is disposed on the inner side of a left and right corner part on a lower side (inner side of the housing 2 more than a case of a square-shaped corner part) of the housing 2, as shown in FIG. 3. In other words, while a length L1 of the cover shaft 16 of the opening and closing cover 3 is shorter than a case where the cover shaft 16 is disposed on the square-shaped corner part, a length L2 of the platen roller shaft 19 of the platen roller 6 is formed so as to be longer than the length L1 (L1<L2) of the cover shaft 16.

As shown in FIGS. 2 to 4, a connecting space 33 is formed by cutting out a left and right end in a left and right direction of the press-release button 13 on a top surface side of the housing 2 (first housing 2A) that includes the power switch 12 and the press-release button 13, such that the platen roller lock engagement part 25 of the cover lock 21 and the drive gear 22 are configured to face the connecting space 33.

Further, a pressable piece 34 is formed on an upper left and right end of the opening and closing cover 3. In a case where the opening and closing cover 3 is closed with respect to the housing 2, the pressable piece 34 is configured to close the connecting space 33, the lockpin 24 of the platen roller 6 is configured to engage the platen roller lock engagement part 25 that faces the connecting space 33, and the platen roller gear 23 of the platen roller 6 is configured to engage with the drive gear 22.

Accordingly, a mechanism for an opening and closing lock of the opening and closing cover 3 (lockpin 24 of the platen roller 6 and the platen roller lock engagement part 25 of the cover lock 21) and a mechanism for a driving force transmission of the platen roller 6 (platen roller gear 23 of the platen roller 6 and the drive gear 22 from the drive motor 18) may be arranged in the connecting space 33, such that a configuration of the portable printer 1 is simplified, and miniaturization of the portable printer 1 is achieved.

A plurality of ribs 28A are arranged at a predetermined height on a bottom surface of the printer housing 2. In addition, a printing part shock absorbing protrusion 30 and an inputter/display shock absorbing protrusion 31 are disposed on a top surface side of the printer housing 2 arranged with the opening and closing cover 3. The inputter/display shock absorbing protrusion 31 extends from a boundary between the inputter/display arrangement area surface 29 towards an upper space direction.

Figure 9:
FIG. 9 shows a perspective view of a member (housing) according to the present disclosure.

As previously mentioned, an example of the housing of the portable printer has been described in the present disclosure. However, the present invention is not limited to the portable printer, and may be also applied to a housing or member of various additional devices. In other words, as shown in FIG. 9, a member 50 includes: an inner layer 52 formed of a first material; and an outer layer 54 formed of a second material having a higher mold shrinkage ratio than the first material, in which the outer layer 54 covers the inner layer 52. A protruding part 52A that covers an end surface 54a of the outer layer 54 is formed on an end of the inner layer 52, such that the member (housing) 50 may be achieved without deformation.

While the protruding part 52A attached to an end of the inner layer 52 mechanically prevents expansion of the second material, so long as the protruding part 52A is attached to at least one end of the inner layer 52, it is more preferable that the protruding part 52A is attached to both ends of the inner layer 52, as shown in FIG. 9. Expansion of the second material may be further prevented by having the protruding part 52A attached to both ends of the inner layer 52, such that a member (housing) 50 may be further achieved without deformation.

DESCRIPTION OF REFERENCE NUMERALS

1 Portable printer;
2 Housing;
2A (First) Housing;
2B (Second) Housing;
3 Opening and closing cover;
4 Printing part;
5 Printing unit;
6 Platen roller;
7 Rechargeable battery;
8 Continuous label body (printing paper);
9 Supplying part;
10 Inputter;
11 Display;
12 Electric switch;
13 Press-release button;
14 Control circuit board;
15 Belt-hanging part;
16 Cover shaft;
17 Thermal head (printing head);
17A Heating element;
18 Drive motor;
19 Platen roller shaft;
20 Unit body;
21 Cover lock;
22 Drive gear;
23 Platen roller gear;
24 Lockpin;
25 Platen roller lock engagement part;
26 Battery cover;
27 Printing part arrangement area surface;
28 Outer layer;
28a (Outer surface) end surface;
32 Reinforcing rib;
33 Connecting space;
34 Pressable piece;
39 Head-biasing spring;
40 Inner layer;
40A Protruding part;
50 Member (housing);
52 Inner layer;
52A Protruding part;
54 Outer layer; and
54a (Outer layer) end surface

The invention claimed is:

1. A portable printer, comprising:
a housing, including:
an inner layer formed of a first material, the inner layer including a protruding part formed on at least one end thereof, and
an outer layer formed of a second material, the outer layer covering the inner layer, the second material having a higher mold shrinkage ratio than the first material, at least one end of the outer layer being covered by the protruding part, the inner layer and the outer layer forming a double molded structure of the housing; and
an opening and closing cover configured to openably and closably attach to the housing.

2. The portable printer according to claim 1, further comprising:
a platen roller rotatably attached to the opening and closing cover; and
a thermal head attached to the housing, a printing paper being sandwiched between the platen roller and the thermal head that opposes the platen roller, and the platen roller feeding the printing paper, while the opening and closing cover is in a closed configuration with respect to the housing.

3. The portable printer according to claim 2, wherein the housing includes a drive motor having a drive gear configured to engage with a platen roller gear attached to the platen roller.

4. The portable printer according to claim 1, wherein the first material is a plastic, and the second material is an elastomer.

5. The portable printer according to claim 1, wherein the protruding part protrudes outward such that an outer surface of the inner layer and the protruding part continuously cover the outer layer.

6. The portable printer according to claim 1, wherein the opening and closing cover is configured to open and close by rotating about a cover shaft.

7. The portable printer according to claim 6, wherein the housing includes a side wall, the side wall configured to stand from a bottom surface of the housing toward the cover shaft.

8. The portable printer according to claim 7, wherein the at least one end of the outer layer is an end on a side of the cover shaft, and the protruding part protrudes outward so as to cover the end on the side of the cover shaft from above.

9. The portable printer according to claim 1, wherein the housing includes a pair of side walls facing each other, each standing from a bottom surface of the housing.

10. The portable printer according to claim 1, wherein each corner part of the housing is formed with a curved surface.

* * * * *